(12) United States Patent
Wenren et al.

(10) Patent No.: US 11,656,430 B2
(45) Date of Patent: May 23, 2023

(54) OPTICAL IMAGING SYSTEM

(71) Applicant: Zhejiang Sunny Optical Co., Ltd, Ningbo (CN)

(72) Inventors: Jianke Wenren, Ningbo (CN); Xule Kong, Ningbo (CN); Mengna Tang, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 222 days.

(21) Appl. No.: 17/007,083

(22) Filed: Aug. 31, 2020

(65) Prior Publication Data

US 2021/0072499 A1 Mar. 11, 2021

(30) Foreign Application Priority Data

Sep. 6, 2019 (CN) .......................... 201910841177.7

(51) Int. Cl.
*G02B 9/34* (2006.01)
*G02B 13/00* (2006.01)
*G02B 13/18* (2006.01)

(52) U.S. Cl.
CPC ............. *G02B 9/34* (2013.01); *G02B 13/004* (2013.01); *G02B 13/18* (2013.01)

(58) Field of Classification Search
CPC ................................ G02B 9/34; G02B 13/004
See application file for complete search history.

(56) References Cited

U.S. PATENT DOCUMENTS

| 8,654,458 | B2 | 2/2014 | Tsai et al. | |
| 2016/0291288 | A1* | 10/2016 | Huang | G02B 13/004 |
| 2019/0107689 | A1* | 4/2019 | Huang | G02B 13/004 |
| 2019/0121098 | A1 | 4/2019 | Zhou et al. | |

FOREIGN PATENT DOCUMENTS

CN 108051898 A 5/2018

* cited by examiner

*Primary Examiner* — Joseph P Martinez
(74) *Attorney, Agent, or Firm* — Sughrue Mion, PLLC

(57) ABSTRACT

The present disclosure discloses an optical imaging system including, sequentially from an object side to an image side along an optical axis, a first lens having positive refractive power; a second lens having negative refractive power; a third lens having positive refractive power; and a fourth lens having negative refractive power. A distance TTL along the optical axis from an object-side surface of the first lens to an imaging plane of the optical imaging system and a distance To along the optical axis from a to-be-captured object to the object-side surface of the first lens satisfy 1<TTL/To<2.5.

20 Claims, 12 Drawing Sheets

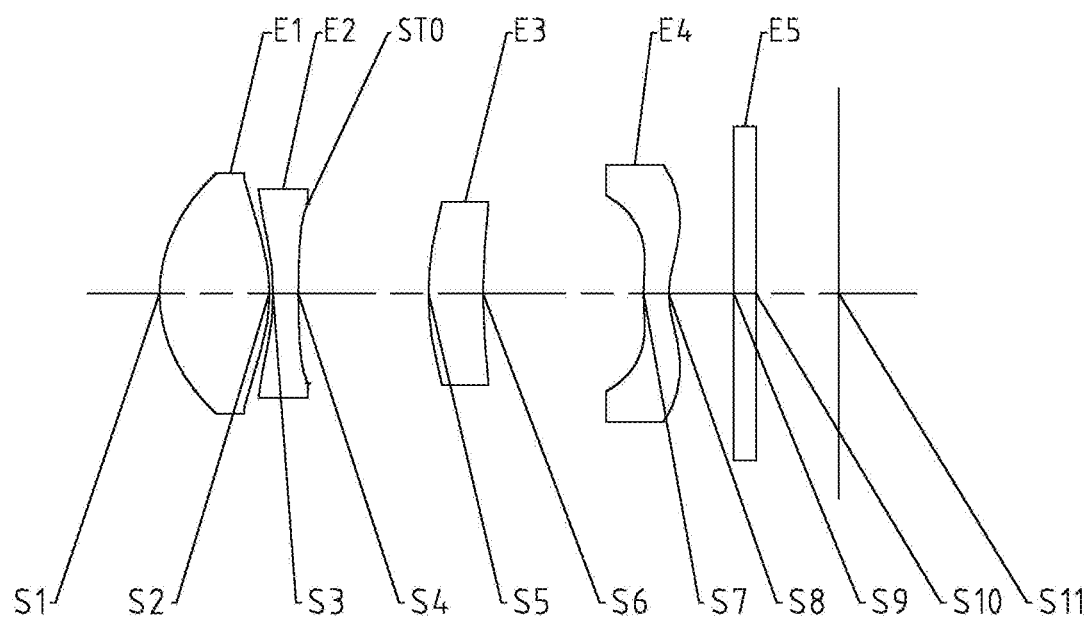
Fig. 1
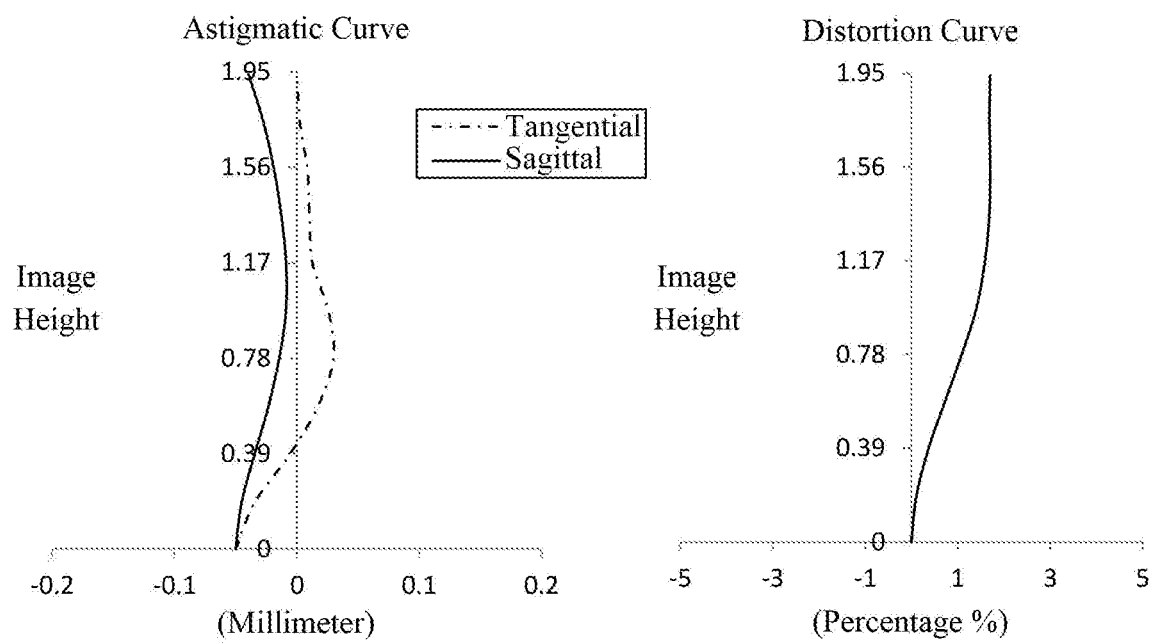
Fig. 2A
Fig. 2B

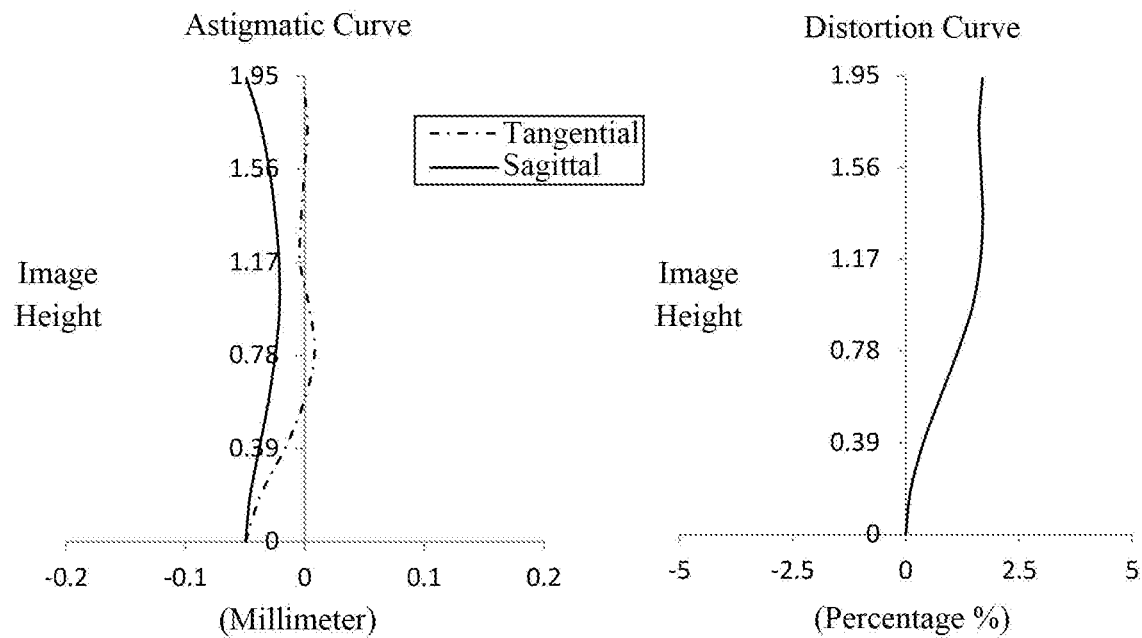
Fig. 4A
Fig. 4B
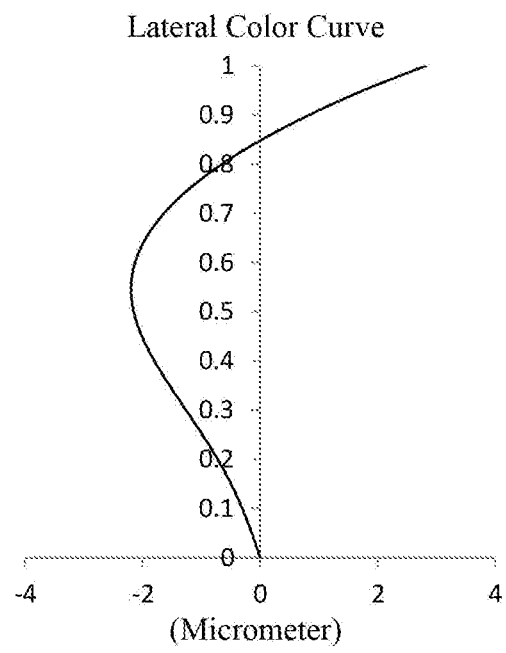
Fig. 4C

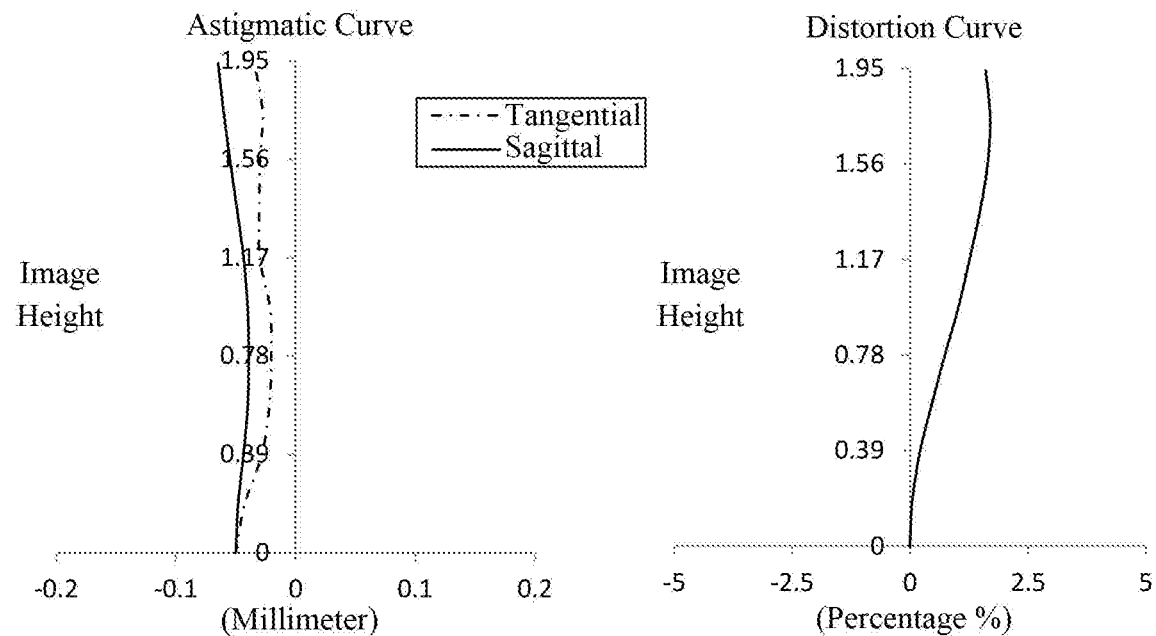
Fig. 8A
Fig. 8B
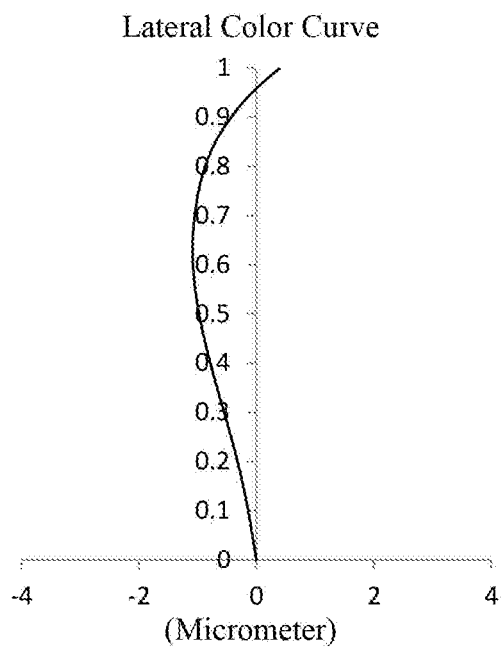
Fig. 8C

OPTICAL IMAGING SYSTEM

CROSS-REFERENCE TO RELATED APPLICATION

This application claims benefit of priority to Chinese Patent Application No. 201910841177.7 filed on Sep. 6, 2019 before the China National Intellectual Property Administration, the entire disclosure of which is incorporated herein by reference in its entity.

TECHNICAL FIELD

The present disclosure relates to the field of optical elements, and more specifically, relates to an optical imaging system.

BACKGROUND

In recent years, with the development of science and technology, the market demand for optical imaging systems suitable for portable electronic products has gradually increased. For example, in a multi-camera module of a mobile phone, various lens assemblies, such as a wide-angle lens assembly, a telephoto lens assembly, or a large-aperture lens assembly, are provided. At the same time, the market also demands a macro lens assembly, which may be used in fingerprint recognition, microscopic imaging and other fields.

In order to meet the requirements of miniaturization and imaging requirements, an optical imaging system that may simultaneously satisfy the characteristics of miniaturization and high quality imaging with a small object distance is required.

SUMMARY

The present disclosure provides an optical imaging system that is applicable to portable electronic products and at least solves or partially addresses at least one of the above disadvantages of the prior art.

The present disclosure provides an optical imaging system which includes, sequentially from an object side to an image side along an optical axis, a first lens having positive refractive power; a second lens having negative refractive power; a third lens having positive refractive power; and a fourth lens having negative refractive power.

In one embodiment, a distance TTL along the optical axis from an object-side surface of the first lens to an imaging plane of the optical imaging system and a distance To along the optical axis from a to-be-captured object to the object-side surface of the first lens may satisfy $1<TTL/To<2.5$.

In one embodiment, a total effective focal length f of the optical imaging system and an entrance pupil diameter EPD of the optical imaging system satisfy $f/EPD<1.0$.

In one embodiment, a distance TTL along the optical axis from an object-side surface of the first lens to an imaging plane of the optical imaging system and a total effective focal length f of the optical imaging system satisfy $4<TTL/f<5$.

In one embodiment, half of a diagonal length ImgH of an effective pixel area on an imaging plane of the optical imaging system and a height Do of a to-be-captured object satisfy $ImgH/Do>1.0$.

In one embodiment, a refractive index N of an object space of the optical imaging system and an aperture angle θ of the object space of the optical imaging system satisfy $N*\sin\theta<0.7$.

In one embodiment, half of a maximum effective aperture DT11 of an object-side surface of the first lens and half of a maximum effective aperture DT42 of an image-side surface of the fourth lens satisfy $0.7<DT11/DT42<1.1$.

In one embodiment, a sum of the center thicknesses ΣCT of the first to the fourth lenses along the optical axis, a spaced interval T23 between the second lens and the third lens along the optical axis and a spaced interval T34 between the third lens and the fourth lens along the optical axis satisfy $1<(T23+T34)/\Sigma CT<1.5$.

In one embodiment, a total effective focal length f of the optical imaging system and a center thickness CT1 of the first lens along the optical axis satisfy $1<f/CT1\leq1.6$.

In one embodiment, a spaced interval T12 between the first lens and the second lens along the optical axis satisfies $T12\leq0.1$ mm.

In one embodiment, a radius of curvature R1 of an object-side surface of the first lens and a radius of curvature R2 of an image-side surface of the first lens satisfy $-0.5<(R1+R2)/(R1-R2)<0$.

In one embodiment, a radius of curvature R3 of an object-side surface of the second lens and a radius of curvature R4 of an image-side surface of the second lens satisfy $-3<(R3-R4)/(R3+R4)<-2$.

In one embodiment, a total effective focal length f of the optical imaging system and a radius of curvature R5 of an object-side surface of the third lens satisfy $f/R5\leq0.6$.

In one embodiment, a total effective focal length f of the optical imaging system, an effective focal length f1 of the first lens and an effective focal length f3 of the third lens satisfy $0.5<f/f1-f/f3<1.0$.

In one embodiment, a total effective focal length f of the optical imaging system, an effective focal length f2 of the second lens and an effective focal length f4 of the fourth lens satisfy $-0.5<f/|f2|-f/|f4|<0$.

In one embodiment, an F number Fno of the optical imaging system in a case of an object distance being finite may satisfy $Fno>3.0$.

The present disclosure employs four lenses, and the optical imaging system has at least one advantageous effect such as miniaturization, macro object distance, and high image quality and the like by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging system according to Example 1 of the present disclosure; and FIGS. 2A to 2C illustrate an astigmatic curve, a distortion curve, and a lateral color curve of the optical imaging system of the Example 1, respectively.

FIGS. 4A to 4C illustrate an astigmatic curve, a distortion curve, and a lateral color curve of the optical imaging system of the Example 2, respectively.

FIGS. 8A to 8C illustrate an astigmatic curve, a distortion curve, and a lateral color curve of the optical imaging system of the Example 4, respectively.

DETAILED DESCRIPTION OF EMBODIMENTS

Figure 2C:
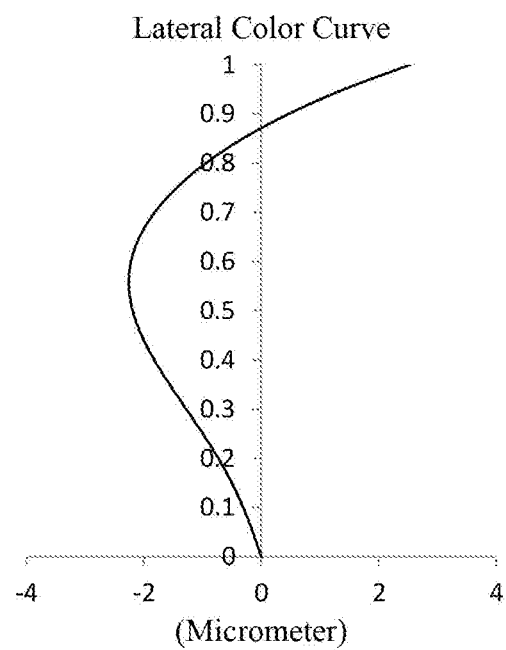

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, four lenses having refractive power, which are a first lens, a second lens, a third lens and a fourth lens. The four lenses are arranged sequentially from an object side to an image side along an optical axis. Among the first to the fourth lenses, there may be an air interval between each two adjacent lenses.

In an exemplary embodiment, the first lens may have positive refractive power; the second lens may have negative refractive power; the third lens may have positive refractive power; and the fourth lens may have negative refractive power. The first lens is used to converge light. The second lens is beneficial to compensating the aberration caused by the first lens. The cooperation of the third lens and the fourth lens balances the refractive power of the lenses located on the object side of the third lens, and compensate the high-order aberrations of the optical imaging system.

In an exemplary embodiment, the optical imaging system according to the present disclosure may satisfy: $1 < TTL/To < 2.5$, where TTL is a distance along the optical axis from an object-side surface of the first lens to an imaging plane of the optical imaging system, and To is a distance along the optical axis from a to-be-captured object to the object-side surface of the first lens. More specifically, TTL and To may satisfy: $1.2 < TTL/To < 2.2$. By enabling the optical imaging system to satisfy the aforementioned conditional expression, it is beneficial to enable the optical imaging system to perform clear imaging in the macro mode, and at the same time, it is also beneficial to reduce the overall length of the optical imaging system.

In an exemplary embodiment, the optical imaging system according to the present disclosure may satisfy: f/EPD<1.0, where f is a total effective focal length of the optical imaging system, and EPD is an entrance pupil diameter of the optical imaging system. More specifically, f and EPD may satisfy: 0.50<f/EPD<0.65. By controlling the ratio of the total effective focal length of the optical imaging system to the entrance pupil diameter of the optical imaging system, on the one hand, it is beneficial to increase the imaging depth of optical imaging system, and on the other hand, it is beneficial to increase the depth of clear imaging of the optical imaging system. In addition, the optical imaging system may also have an appropriate amount of light enter.

In an exemplary embodiment, the optical imaging system according to the present disclosure may satisfy: 4<TTL/f<5, where TTL is a distance along the optical axis from an object-side surface of the first lens to an imaging plane of the optical imaging system, and f is a total effective focal length of the optical imaging system. More specifically, TTL and f may satisfy: 4.52<TTL/f<4.85. By controlling the ratio of the total optical length to the total effective focal length of the optical imaging system, it is beneficial to control the field-of-view of the optical imaging system, thereby enabling the optical imaging system to capture more image information while having appropriate imaging performance.

In an exemplary embodiment, the optical imaging system according to the present disclosure may satisfy: ImgH/Do>1.0, where ImgH is half of a diagonal length of an effective pixel area on an imaging plane of the optical imaging system, and Do is a height of a to-be-captured object. More specifically, ImgH and Do may satisfy: 1.4<ImgH/Do. By enabling the optical imaging system to satisfy the aforementioned conditional expression, it is beneficial to make the optical imaging system have a larger magnification under macro mode, so as to have a microscopic imaging effect.

Figure 17:
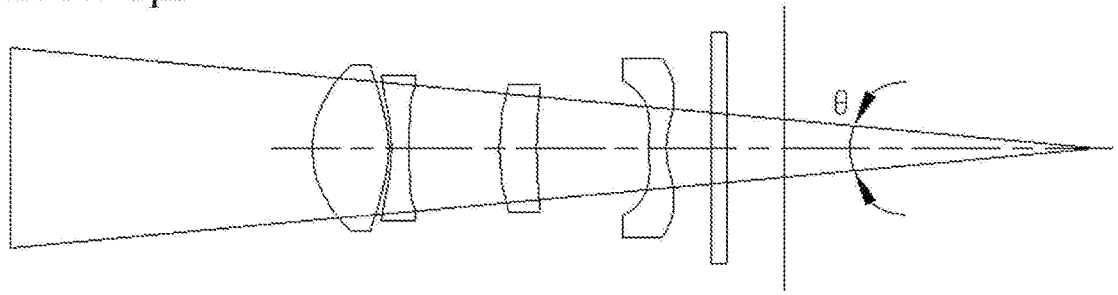
FIG. 17 schematically illustrates the aperture angle θ of the object space.

In an exemplary embodiment, the optical imaging system according to the present disclosure may satisfy: N*sin θ<0.7, where N is a refractive index of a medium in an object space of the optical imaging system, and θ is an aperture angle of the object space of the optical imaging system. Referring to FIG. 17, the aperture angle of the object space is the angle corresponding to the entrance pupil with the point on the optical axis as the vertex. Specifically, the medium in the object space may be air or grease. More specifically, N and θ may satisfy: 0.2<N*sin θ<0.3. By controlling the refractive index of the object space and the aperture angle of the object space, it is beneficial for the optical imaging system to form an enlarged image with respect to the to-be-captured object, so that the optical imaging system has the characteristic of microscopic imaging.

In an exemplary embodiment, the optical imaging system according to the present disclosure may satisfy: 0.7<DT11/DT42<1.1, where DT11 is half of a maximum effective aperture of an object-side surface of the first lens, and DT42 is half of a maximum effective aperture of an image-side surface of the fourth lens. More specifically, DT11 and DT42 may satisfy: 0.76<DT11/DT42<1.06. By controlling the maximum effective half-aperture of the object-side surface of the first lens and the maximum effective half-aperture of the image-side surface of the fourth lens, the size of the optical imaging system is advantageously reduced. When the optical imaging system is installed in a device, it may occupy a small installation space.

In an exemplary embodiment, the optical imaging system according to the present disclosure may satisfy: 1<(T23+T34)/ΣCT<1.5, where ΣCT is a sum of the center thicknesses of the first lens to the fourth lens along the optical axis, T23 is a spaced interval between the second lens and the third lens along the optical axis, and T34 is a spaced interval between the third lens and the fourth lens along the optical axis. As an example, ΣCT=CT1+CT2+CT3+CT4. More specifically, ΣCT, T23 and T34 may satisfy: 1<(T23+T34)/ΣCT<1.5. By controlling the center thicknesses of the first lens to the fourth lens and the spaced intervals between the lenses, it is beneficial to rationally configure the refractive power of each lens, and it is beneficial to smooth the transition of light at each lens, thereby reducing the tolerance sensitivity of each lens.

In an exemplary embodiment, the optical imaging system according to the present disclosure may satisfy: 1<f/CT1≤1.6, where f is a total effective focal length of the optical imaging system, and CT1 is a center thickness of the first lens along the optical axis. More specifically, f and CT1 may satisfy: 1.1<f/CT1≤1.6. By controlling the ratio of the total effective focal length to the center thickness of the first lens, the refractive power and surface shape of the first lens may be controlled, which is beneficial to make the first lens that bears more refractive power have better manufacturability.

In an exemplary embodiment, the optical imaging system according to the present disclosure may satisfy: T12≤0.1 mm, where T12 is a spaced interval between the first lens and the second lens along the optical axis. More specifically, T12 may satisfy: T12≤0.06 mm. By controlling the spaced interval between the first lens and the second lens, it is beneficial to reduce the total optical length of the optical imaging system.

In an exemplary embodiment, the optical imaging system according to the present disclosure may satisfy: −0.5<(R1+R2)/(R1−R2)<0, where R1 is a radius of curvature of an object-side surface of the first lens, and R2 is a radius of curvature of an image-side surface of the first lens. More specifically, R1 and R2 may satisfy: −0.3<(R1+R2)/(R1−R2)<−0.2. Controlling the radius of curvature of the surfaces of the first lens is beneficial to control the shape of the first lens, thereby enabling the first lens to have good manufacturability.

In an exemplary embodiment, the optical imaging system according to the present disclosure may satisfy: −3<(R3−R4)/(R3+R4)<−2, where R3 is a radius of curvature of an object-side surface of the second lens, and R4 is a radius of curvature of an image-side surface of the second lens. More specifically, R3 and R4 may satisfy: −2.96<(R3−R4)/(R3+R4)<−2.56. Controlling the radius of curvature of the surfaces of the second lens is beneficial to control the surface shape of the second lens, so that the second lens has good manufacturability. At the same time, it is also beneficial to control the refractive power of the second lens.

In an exemplary embodiment, the optical imaging system according to the present disclosure may satisfy: f/R5≤0.6, where f is a total effective focal length of the optical imaging system, and R5 is a radius of curvature of an object-side surface of the third lens. More specifically, f and R5 may satisfy: 0.37<f/R5≤0.57. By controlling the ratio of the total effective focal length to the radius of curvature of the object-side surface of the third lens, it is beneficial to control the refractive power of the third lens, and may effectively balance the refractive power of each lens.

In an exemplary embodiment, the optical imaging system according to the present disclosure may satisfy: $0.5<f/f1-f/f3<1.0$, where f is a total effective focal length of the optical imaging system, f1 is an effective focal length of the first lens, and f3 is an effective focal length of the third lens. More specifically, f, f1 and f3 may satisfy: $0.55<f/f1-f/f3<0.65$. By reasonably controlling the effective focal length of the first lens, the effective focal length of the third lens and the total effective focal length, it is beneficial to control the refractive power of the first lens and the refractive power of the third lens, and it is beneficial to make the refractive power of each lens in the optical imaging system to cooperate with each other, so that the optical imaging system has good imaging performance.

In an exemplary embodiment, the optical imaging system according to the present disclosure may satisfy: $-0.5<f/|f2|-f/|f4|<0$, where f is a total effective focal length of the optical imaging system, f2 is an effective focal length of the second lens, and f4 is an effective focal length of the fourth lens. More specifically, f, f2 and f4 may satisfy: $-0.23<f/|f2|-f/|f4|<-0.13$. By reasonably configuring the effective focal length of the second lens, the effective focal length of the fourth lens, and the total effective focal length, it is beneficial to control the refractive power of the second lens and the refractive power of the fourth lens, so that the negative refractive power of the second lens and the negative refractive power of the fourth lens are balanced with the positive refractive power of the first lens and the positive refractive power of the third lens, and the refractive power of each lens is cooperated with each other.

In an exemplary embodiment, the optical imaging system according to the present disclosure may satisfy: Fno>3.0, where Fno is an F number of the optical imaging system in the case of an object distance being finite. More specifically, Fno may satisfy: Fno>3.1. By controlling the number of aperture of the optical imaging system in the case of the object distance being finite, it is beneficial to enable the optical imaging system to have a brighter field-of-view and higher imaging quality when using in macro mode.

In an exemplary embodiment, the optical imaging system described above may further include at least one stop. The stop may be disposed at an appropriate position as needed, for example, between the object side and the first lens. As an example, the stop may be disposed between the second lens and the third lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as four lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as a deep depth of field, a suitable magnified image, and a suitable amount of light enter. The optical imaging system according to the present disclosure may be applied to the fields of fingerprint recognition, microscopic imaging and the like.

In the embodiments of the present disclosure, at least one of the surfaces of lenses is aspheric, that is, at least one of the object-side surface of the first lens to the image-side surface of the fourth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens and the fourth lens is aspheric. Optionally, the object-side surface and the image-side surface of each of the first lens, the second lens, the third lens and the fourth lens are aspheric. Optionally, the surfaces on both sides of each lens may also be spherical.

However, it will be understood by those skilled in the art that the number of lenses constituting the optical imaging system may be varied to achieve the various results and advantages described in this specification without departing from the technical solution claimed by the present disclosure. For example, although the embodiment is described by taking four lenses as an example, the optical imaging system is not limited to include four lenses. The optical imaging system may also include other numbers of lenses if desired.

Some specific examples of an optical imaging system applicable to the above embodiment will be further described below with reference to the accompanying drawings.

EXAMPLE 1

An optical imaging system according to example 1 of the present disclosure is described below with reference to FIG. 1 to FIG. 2C. FIG. 1 shows a schematic structural view of the optical imaging system according to example 1 of the present disclosure.

As shown in FIG. 1, the optical imaging system includes a first lens E1, a second lens E2, a stop STO, a third lens E3, a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/Distance | Material Refractive index | Abbe number | Focal length | Conic coefficient |
|---|---|---|---|---|---|---|---|
| OBJ | Spherical | Infinite | 4.0000 | | | | |
| S1 | Aspheric | 1.3616 | 1.0364 | 1.546 | 56.11 | 1.76 | 0.0371 |
| S2 | Aspheric | −2.3835 | 0.0363 | | | | −4.6364 |
| S3 | Aspheric | −3.8733 | 0.2385 | 1.678 | 19.25 | −3.81 | 9.5261 |
| S4 | Aspheric | 7.9274 | 0.0917 | | | | 77.1410 |
| STO | Spherical | Infinite | 1.1403 | | | | |
| S5 | Aspheric | 2.9102 | 0.5148 | 1.678 | 19.25 | 7.39 | −99.0000 |
| S6 | Aspheric | 6.4636 | 1.5170 | | | | −62.9269 |
| S7 | Aspheric | 2.0325 | 0.2385 | 1.536 | 55.74 | −2.51 | −29.8955 |
| S8 | Aspheric | 0.7770 | 0.6152 | | | | −5.4945 |
| S9 | Spherical | Infinite | 0.2100 | 1.517 | 64.17 | | |
| S10 | Spherical | Infinite | 0.7813 | | | | |
| S11 | Spherical | Infinite | | | | | |

In example 1, a total effective focal length f of the optical imaging system is 1.41 mm, and an on-axis distance TTL from the object-side surface S1 of the first lens E1 to the imaging plane S11 is 6.42 mm.

In example 1, the object-side surface and the image-side surface of any one of the first lens E1 to the fourth lens E4 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S8 in example 1.

FIG. 2A illustrates an astigmatic curve of the optical imaging system according to example 1, representing a curvature of a tangential plane and a curvature of a sagittal plane. FIG. 2B illustrates a distortion curve of the optical imaging system according to example 1, representing amounts of distortion corresponding to different image heights. FIG. 2C illustrates a lateral color curve of the optical imaging system according to example 1, representing deviations of different image heights on an imaging plane after light passes through the optical imaging system. It can be seen from FIG. 2A to FIG. 2C that the optical imaging system provided in example 1 may achieve good image quality.

EXAMPLE 2

Figure 3:
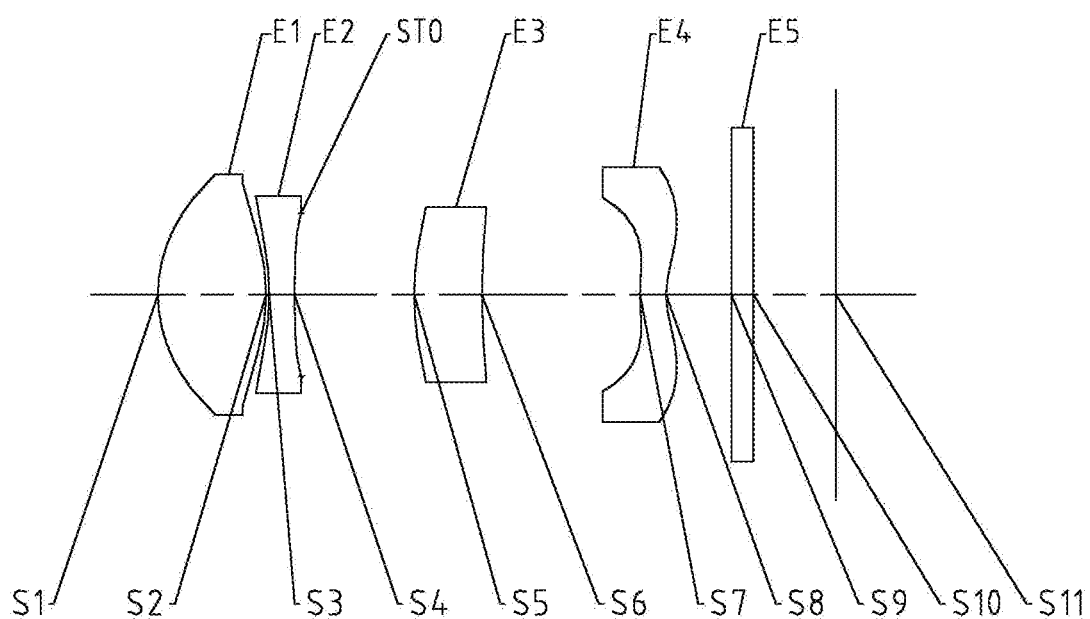
FIG. 3 illustrates a schematic structural view of an optical imaging system according to Example 2 of the present disclosure.

An optical imaging system according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a first lens E1, a second lens E2, a stop STO, a third lens E3,

TABLE 2

| Surface number | A4 | A6 | A8 | A10 | A12 |
|---|---|---|---|---|---|
| S1 | −3.3155E−02 | 1.0783E−01 | −7.7128E−01 | 2.7552E+00 | −5.7183E+00 |
| S2 | −9.5211E−01 | 4.6407E+00 | −1.0786E+01 | 1.2474E+01 | −3.0152E+00 |
| S3 | −1.0118E+00 | 4.6720E+00 | −7.7344E+00 | −4.1760E+00 | 4.0346E+01 |
| S4 | −2.1324E−01 | 9.7890E−01 | −1.4979E+00 | 4.0577E+00 | −2.6034E+01 |
| S5 | 4.6989E−01 | −1.8231E+00 | 6.5626E+00 | −1.7914E+01 | 3.4072E+01 |
| S6 | 3.0369E−02 | 2.2725E−01 | −1.4403E+00 | 4.9501E+00 | −1.1240E+01 |
| S7 | −1.1166E+00 | 1.6811E+00 | −5.1718E+00 | 1.8842E+01 | −4.7831E+01 |
| S8 | −6.7653E−01 | 8.8267E−01 | −6.7812E−01 | −4.7351E−02 | 7.0006E−01 |

| Surface number | A14 | A16 | A18 | A20 |
|---|---|---|---|---|
| S1 | 7.0631E+00 | −5.1293E+00 | 2.0207E+00 | −3.3399E−01 |
| S2 | −9.6926E+00 | 1.2104E+01 | −5.8731E+00 | 1.0733E+00 |
| S3 | −7.3349E+01 | 6.5700E+01 | −2.9963E+01 | 5.5448E+00 |
| S4 | 8.6376E+01 | −1.4280E+02 | 1.1730E+02 | −3.8501E+01 |
| S5 | −4.3455E+01 | 3.5004E+01 | −1.6022E+01 | 3.1663E+00 |
| S6 | 1.6058E+01 | −1.4072E+01 | 6.8823E+00 | −1.4208E+00 |
| S7 | 7.3937E+01 | −6.6956E+01 | 3.2401E+01 | −6.4139E+00 |
| S8 | −7.6214E−01 | 4.2098E−01 | −1.2607E−01 | 1.6561E−02 | a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

In example 2, a total effective focal length f of the optical imaging system is 1.40 mm, and an on-axis distance TTL from the object-side surface S1 of the first lens E1 to the imaging plane S11 is 6.40 mm.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

amounts of distortion corresponding to different image heights. FIG. 4C illustrates a lateral color curve of the optical imaging system according to example 2, representing deviations of different image heights on an imaging plane after light passes through the optical imaging system. It can be seen from FIG. 4A to FIG. 4C that the optical imaging system provided in example 2 may achieve good image quality.

EXAMPLE 3

Figure 5:
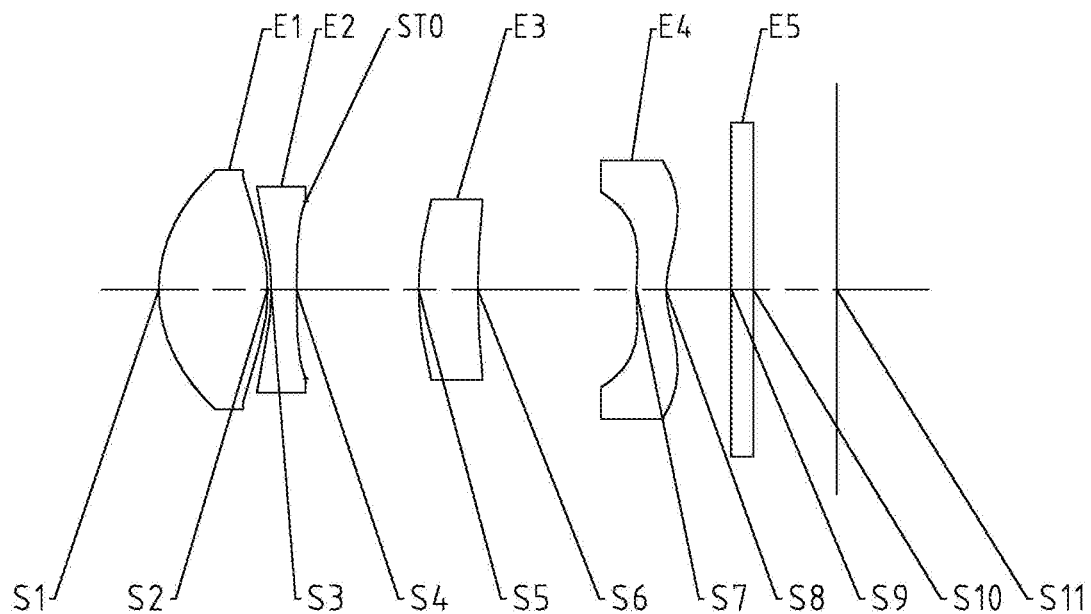
FIG. 5 illustrates a schematic structural view of an optical imaging system according to Example 3 of the present disclosure.

An optical imaging system according to example 3 of the present disclosure is described below with reference to FIG. 5 to FIG. 6C. FIG. 5 shows a schematic structural view of the optical imaging system according to example 3 of the present disclosure.

As shown in FIG. 5, the optical imaging system includes a first lens E1, a second lens E2, a stop STO, a third lens E3, a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 4.0000 | | | | |
| S1 | Aspheric | 1.3530 | 1.0208 | 1.546 | 56.11 | 1.76 | 0.0337 |
| S2 | Aspheric | −2.4091 | 0.0300 | | | | −5.2058 |
| S3 | Aspheric | −3.8514 | 0.2385 | 1.678 | 19.25 | −3.78 | 10.4476 |
| S4 | Aspheric | 7.8264 | 0.0639 | | | | 79.2166 |
| STO | Spherical | Infinite | 1.0669 | | | | |
| S5 | Aspheric | 2.9507 | 0.6382 | 1.678 | 19.25 | 7.49 | −99.0000 |
| S6 | Aspheric | 6.4371 | 1.4937 | | | | −97.5021 |
| S7 | Aspheric | 2.0811 | 0.2454 | 1.536 | 55.74 | −2.54 | −33.1741 |
| S8 | Aspheric | 0.7897 | 0.6152 | | | | −5.4585 |
| S9 | Spherical | Infinite | 0.2100 | 1.517 | 64.17 | | |
| S10 | Spherical | Infinite | 0.7775 | | | | |
| S11 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −2.5603E−02 | 3.1080E−02 | −2.3901E−01 | 8.8799E−01 | −2.0166E+00 | 2.7517E+00 | −2.2038E+00 | 9.4326E−01 | −1.6614E−01 |
| S2 | −1.0940E+00 | 6.8572E+00 | −2.3252E+01 | 4.9988E+01 | −6.9946E+01 | 6.3066E+01 | −3.5193E+01 | 1.1029E+01 | −1.4815E+00 |
| S3 | −1.1273E+00 | 6.8492E+00 | −2.1137E+01 | 3.8569E+01 | −3.7996E+01 | 1.0736E+01 | 1.4854E+01 | −1.4650E+01 | 3.9433E+00 |
| S4 | −2.0858E−01 | 9.2688E−01 | −3.2332E−01 | −7.4887E+00 | 2.5221E+01 | −3.3656E+01 | 1.1301E+01 | 1.5190E+01 | −1.1418E+01 |
| S5 | 4.3809E−01 | −1.8496E+00 | 6.9877E+00 | −1.9805E+01 | 3.8735E+01 | −5.0190E+01 | 4.0665E+01 | −1.8522E+01 | 3.5990E+00 |
| S6 | 2.8540E−02 | 6.5985E−02 | −5.5080E−01 | 1.8030E+00 | −3.9941E+00 | 5.5409E+00 | −4.7061E+00 | 2.2369E+00 | −4.4939E−01 |
| S7 | −1.0598E+00 | 1.2700E+00 | −3.6803E+00 | 1.4476E+01 | −3.9187E+01 | 6.3369E+01 | −5.9620E+01 | 2.9935E+01 | −6.1464E+00 |
| S8 | −6.8035E−01 | 8.5177E−01 | −6.5423E−01 | 1.1324E−02 | 5.2873E−01 | −5.5130E−01 | 2.7641E−01 | −7.2276E−02 | 8.1061E−03 |

FIG. 4A illustrates an astigmatic curve of the optical imaging system according to example 2, representing a curvature of a tangential plane and a curvature of a sagittal plane. FIG. 4B illustrates a distortion curve of the optical imaging system according to example 2, representing power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

In example 3, a total effective focal length f of the optical imaging system is 1.41 mm, and an on-axis distance TTL from the object-side surface S1 of the first lens E1 to the imaging plane S11 is 6.40 mm.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 3.8000 | | | | |
| S1 | Aspheric | 1.3578 | 1.0270 | 1.546 | 56.11 | 1.76 | 0.0353 |
| S2 | Aspheric | −2.3877 | 0.0346 | | | | −4.7534 |
| S3 | Aspheric | −3.8565 | 0.2385 | 1.678 | 19.25 | −3.79 | 9.8747 |
| S4 | Aspheric | 7.8637 | 0.0883 | | | | 77.6170 |
| STO | Spherical | Infinite | 1.0655 | | | | |
| S5 | Aspheric | 2.9661 | 0.5571 | 1.678 | 19.25 | 7.45 | −99.0000 |
| S6 | Aspheric | 6.6492 | 1.4974 | | | | −74.1062 |
| S7 | Aspheric | 2.3641 | 0.2814 | 1.536 | 55.74 | −2.54 | −22.2669 |
| S8 | Aspheric | 0.8296 | 0.6152 | | | | −5.1593 |
| S9 | Spherical | Infinite | 0.2100 | 1.517 | 64.17 | | |
| S10 | Spherical | Infinite | 0.7850 | | | | |
| S11 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −3.2582E−02 | 1.0816E−01 | −7.5077E−01 | 2.6654E+00 | −5.5304E+00 | 6.8243E+00 | −4.9343E+00 | 1.9259E+00 | −3.1373E−01 |
| S2 | −9.6189E−01 | 4.7622E+00 | −1.0891E+01 | 1.0956E+01 | 2.8832E+00 | −1.9552E+01 | 2.0819E+01 | −9.8613E+00 | 1.8199E+00 |
| S3 | −1.0059E+00 | 4.5909E+00 | −6.3740E+00 | −1.1957E+01 | 6.2289E+01 | −1.0787E+02 | 9.6582E+01 | −4.4643E+01 | 8.4199E+00 |
| S4 | −1.9965E−01 | 7.5607E−01 | 2.2045E−01 | −2.5408E+00 | −1.4160E+01 | 8.2426E+01 | −1.6181E+02 | 1.4541E+02 | −5.0698E+01 |
| S5 | 4.4227E−01 | −1.7329E+00 | 6.3675E+00 | −1.7878E+01 | 3.5112E+01 | −4.6191E+01 | 3.8222E+01 | −1.7842E+01 | 3.5628E+00 |
| S6 | 2.3026E−02 | 1.9453E−01 | −1.1948E+00 | 3.9991E+00 | −8.8383E+00 | 1.2226E+01 | −1.0353E+01 | 4.9019E+00 | −9.8318E−01 |
| S7 | −1.0576E+00 | 1.5523E+00 | −4.7092E+00 | 1.6768E+01 | −4.2464E+01 | 6.6024E+01 | −6.0253E+01 | 2.9374E+01 | −5.8519E+00 |
| S8 | −6.2060E−01 | 7.8222E−01 | −6.0212E−01 | −3.5612E−02 | 6.2123E−01 | −6.8477E−01 | 3.8057E−01 | −1.1370E−01 | 1.4718E−02 |

Figure 6A:
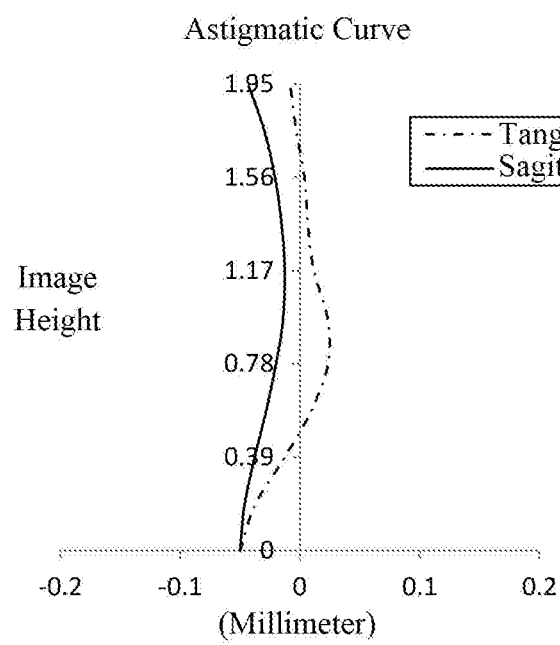
FIGS. 6A to 6C illustrate an astigmatic curve, a distortion curve, and a lateral color curve of the optical imaging system of the Example 3, respectively.
Figure 6B:
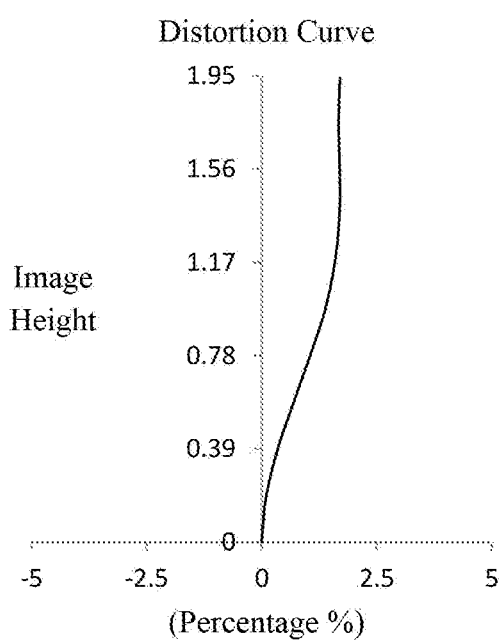
Figure 6C:
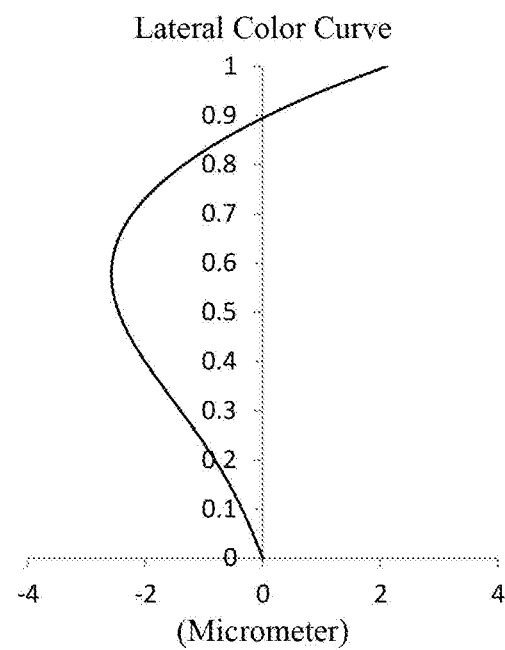

FIG. 6A illustrates an astigmatic curve of the optical imaging system according to example 3, representing a curvature of a tangential plane and a curvature of a sagittal plane. FIG. 6B illustrates a distortion curve of the optical imaging system according to example 3, representing amounts of distortion corresponding to different image heights. FIG. 6C illustrates a lateral color curve of the optical imaging system according to example 3, representing deviations of different image heights on an imaging plane after light passes through the optical imaging system. It can be seen from FIG. 6A to FIG. 6C that the optical imaging system provided in example 3 may achieve good image quality.

EXAMPLE 4

Figure 7:
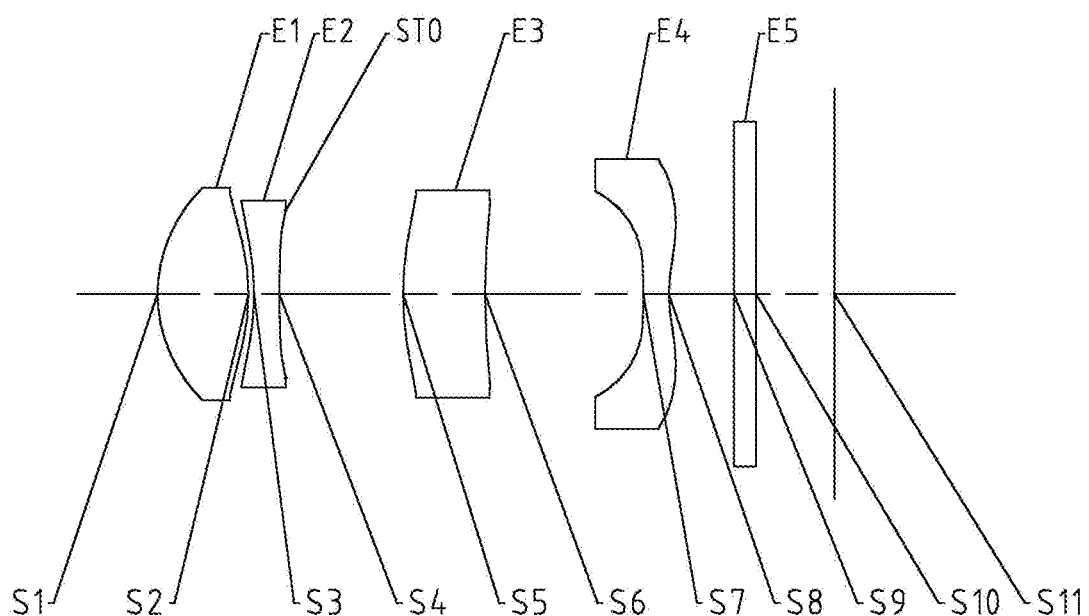
FIG. 7 illustrates a schematic structural view of an optical imaging system according to Example 4 of the present disclosure.

An optical imaging system according to example 4 of the present disclosure is described below with reference to FIG. 7 to FIG. 8C. FIG. 7 shows a schematic structural view of the optical imaging system according to example 4 of the present disclosure.

As shown in FIG. 7, the optical imaging system includes a first lens E1, a second lens E2, a stop STO, a third lens E3, a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

In example 4, a total effective focal length f of the optical imaging system is 1.37 mm, and an on-axis distance TTL from the object-side surface S1 of the first lens E1 to the imaging plane S11 is 6.40 mm.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 3.0000 | | | | |
| S1 | Aspheric | 1.3501 | 0.8599 | 1.546 | 56.11 | 1.73 | 0.0758 |
| S2 | Aspheric | −2.4535 | 0.0523 | | | | −6.6490 |
| S3 | Aspheric | −3.7236 | 0.2385 | 1.678 | 19.25 | −3.78 | 11.2242 |
| S4 | Aspheric | 8.4129 | 0.0632 | | | | 73.6446 |
| STO | Spherical | Infinite | 1.1082 | | | | |
| S5 | Aspheric | 3.1469 | 0.7735 | 1.678 | 19.25 | 7.08 | −99.0000 |
| S6 | Aspheric | 8.2611 | 1.4968 | | | | −99.0000 |
| S7 | Aspheric | 18.1351 | 0.2412 | 1.536 | 55.74 | −2.33 | −99.0000 |
| S8 | Aspheric | 1.1655 | 0.6152 | | | | −13.7141 |
| S9 | Spherical | Infinite | 0.2100 | 1.517 | 64.17 | | |
| S10 | Spherical | Infinite | 0.7411 | | | | |
| S11 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −2.7222E−02 | −6.4168E−02 | 6.7628E−01 | −3.0296E+00 | 7.2038E+00 | −9.9625E+00 | 8.0412E+00 | −3.5081E+00 | 6.3630E−01 |
| S2 | −9.1276E−01 | 6.4108E+00 | −2.5768E+01 | 6.6096E+01 | −1.0944E+02 | 1.1606E+02 | −7.5984E+01 | 2.7896E+01 | −4.3836E+00 |
| S3 | −1.0205E+00 | 7.4941E+00 | −3.0366E+01 | 7.8997E+01 | −1.3145E+02 | 1.3746E+02 | −8.6299E+01 | 2.9267E+01 | −4.0383E+00 |
| S4 | −2.3481E−01 | 1.4125E+00 | −2.7540E+00 | −3.2299E+00 | 2.9056E+01 | −5.9637E+01 | 4.9028E+01 | −6.1409E+00 | −8.2515E+00 |
| S5 | 3.8259E−01 | −1.3604E+00 | 4.3984E+00 | −1.0668E+01 | 1.7703E+01 | −1.9558E+01 | 1.3657E+01 | −5.4800E+00 | 9.7111E−01 |
| S6 | 5.1445E−02 | 1.1269E−01 | −8.0832E−01 | 2.7213E+00 | −6.0210E+00 | 8.1106E+00 | −6.5631E+00 | 2.9448E+00 | −5.5840E−01 |
| S7 | −1.2521E+00 | 3.5739E+00 | −1.3534E+01 | 4.2269E+01 | −9.0866E+01 | 1.2556E+02 | −1.0584E+02 | 4.9060E+01 | −9.4968E+00 |
| S8 | −3.9445E−01 | 4.5823E−01 | −5.2266E−01 | 8.5092E−01 | −1.4376E+00 | 1.5985E+00 | −1.0368E+00 | 3.5811E−01 | −5.0915E−02 |

FIG. 8A illustrates an astigmatic curve of the optical imaging system according to example 4, representing a curvature of a tangential plane and a curvature of a sagittal plane. FIG. 8B illustrates a distortion curve of the optical imaging system according to example 4, representing amounts of distortion corresponding to different image heights. FIG. 8C illustrates a lateral color curve of the optical imaging system according to example 4, representing deviations of different image heights on an imaging plane after light passes through the optical imaging system. It can be seen from FIG. 8A to FIG. 8C that the optical imaging system provided in example 4 may achieve good image quality.

EXAMPLE 5

Figure 9:
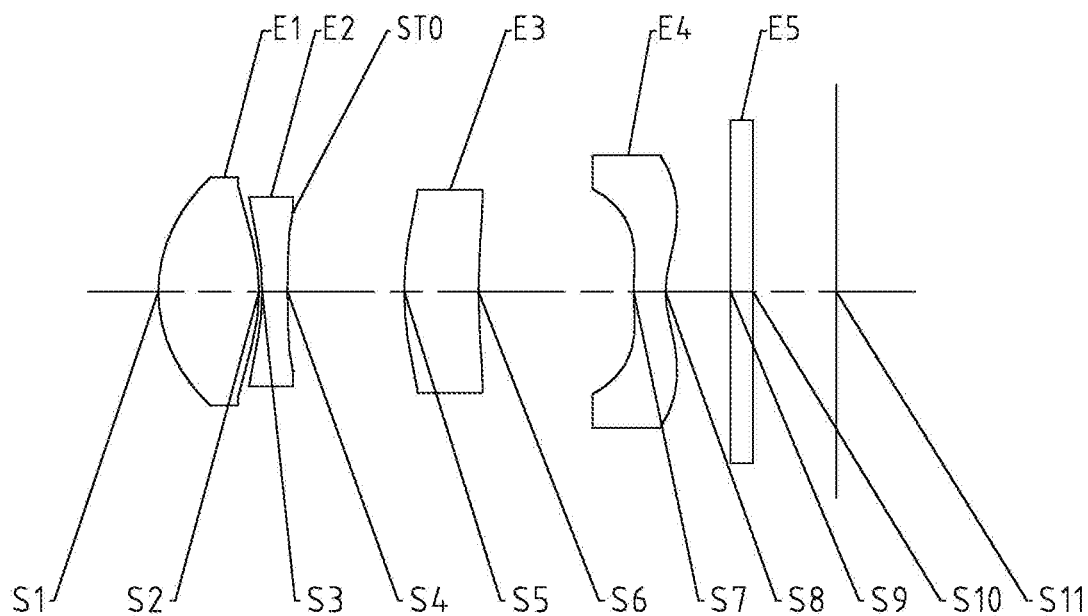
FIG. 9 illustrates a schematic structural view of an optical imaging system according to Example 5 of the present disclosure.

An optical imaging system according to example 5 of the present disclosure is described below with reference to FIG. 9 to FIG. 10C. FIG. 9 shows a schematic structural view of the optical imaging system according to example 5 of the present disclosure.

As shown in FIG. 9, the optical imaging system includes a first lens E1, a second lens E2, a stop STO, a third lens E3, a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

In example 5, a total effective focal length f of the optical imaging system is 1.41 mm, and an on-axis distance TTL from the object-side surface S1 of the first lens E1 to the imaging plane S11 is 6.40 mm.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 3.4000 | | | | |
| S1 | Aspheric | 1.3506 | 0.9505 | 1.546 | 56.11 | 1.74 | 0.0564 |
| S2 | Aspheric | −2.4283 | 0.0300 | | | | −5.8115 |
| S3 | Aspheric | −3.7467 | 0.2385 | 1.678 | 19.25 | −3.77 | 10.9500 |
| S4 | Aspheric | 8.2369 | 0.0535 | | | | 80.7463 |
| STO | Spherical | Infinite | 1.0495 | | | | |
| S5 | Aspheric | 3.0223 | 0.7002 | 1.678 | 19.25 | 7.53 | −99.0000 |
| S6 | Aspheric | 6.7268 | 1.4650 | | | | −99.0000 |
| S7 | Aspheric | 2.5943 | 0.3007 | 1.536 | 55.74 | −2.57 | −53.5655 |
| S8 | Aspheric | 0.8645 | 0.6152 | | | | −5.6666 |
| S9 | Spherical | Infinite | 0.2100 | 1.517 | 64.17 | | |
| S10 | Spherical | Infinite | 0.7870 | | | | |
| S11 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −2.1389E−02 | −3.3542E−02 | 2.7288E−01 | −1.1822E+00 | 2.7821E+00 | −3.8470E+00 | 3.1097E+00 | −1.3660E+00 | 2.5112E−01 |
| S2 | −1.1188E+00 | 7.7210E+00 | −2.9869E+01 | 7.4972E+01 | −1.2433E+02 | 1.3444E+02 | −9.0858E+01 | 3.4767E+01 | −5.7395E+00 |
| S3 | −1.1437E+00 | 7.7864E+00 | −2.8824E+01 | 6.9376E+01 | −1.0896E+02 | 1.0883E+02 | −6.5171E+01 | 2.0718E+01 | −2.5641E+00 |
| S4 | −2.1126E−01 | 1.0767E+00 | −1.5711E+00 | −2.8489E+00 | 1.6677E+01 | −2.7512E+01 | 1.4024E+01 | 9.0360E+00 | −9.2372E+00 |
| S5 | 4.0469E−01 | −1.6706E+00 | 6.1582E+00 | −1.7071E+01 | 3.2721E+01 | −4.1665E+01 | 3.3281E+01 | −1.4994E+01 | 2.8904E+00 |
| S6 | 2.1709E−02 | 8.1335E−02 | −5.3950E−01 | 1.6756E+00 | −3.5062E+00 | 4.5639E+00 | −3.6164E+00 | 1.6014E+00 | −3.0055E−01 |
| S7 | −7.9617E−01 | 7.0896E−01 | −2.2866E+00 | 9.6786E+00 | −2.5288E+01 | 3.8581E+01 | −3.4176E+01 | 1.6183E+01 | −3.1385E+00 |
| S8 | −5.0277E−01 | 5.3715E−01 | −4.6742E−01 | 4.2840E−01 | −5.3955E−01 | 5.7343E−01 | −3.7103E−01 | 1.2750E−01 | −1.7925E−02 |

Figure 10A:
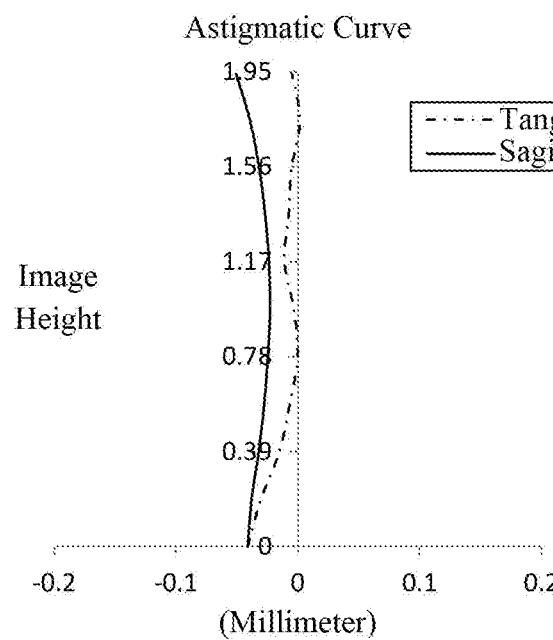
FIGS. 10A to 10C illustrate an astigmatic curve, a distortion curve, and a lateral color curve of the optical imaging system of the Example 5, respectively.
Figure 10B:
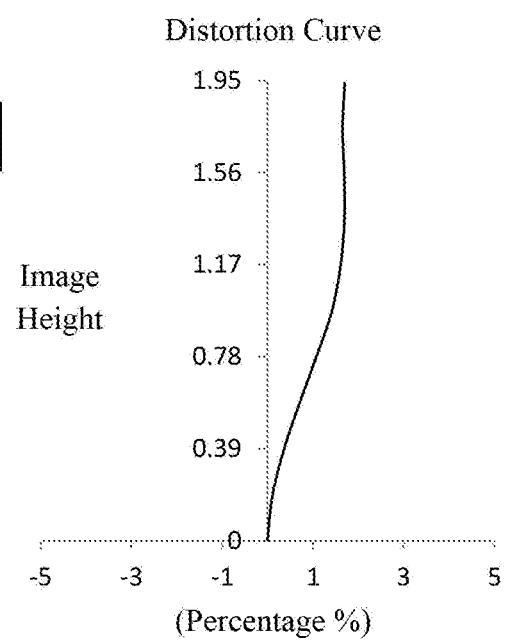
Figure 10C:
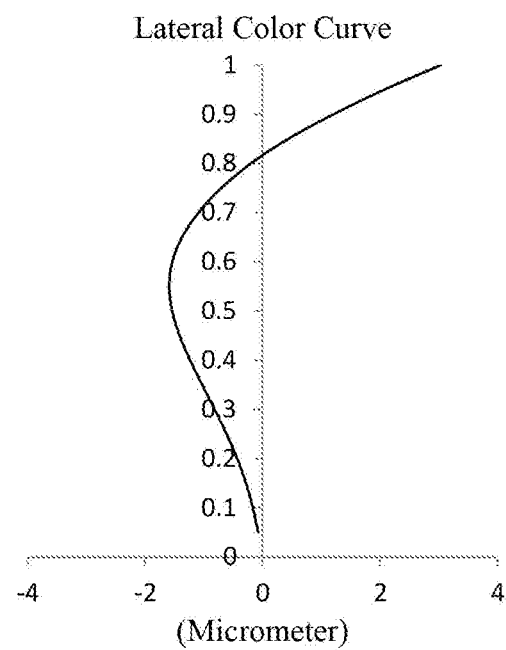

FIG. 10A illustrates an astigmatic curve of the optical imaging system according to example 5, representing a curvature of a tangential plane and a curvature of a sagittal plane. FIG. 10B illustrates a distortion curve of the optical imaging system according to example 5, representing amounts of distortion corresponding to different image heights. FIG. 10C illustrates a lateral color curve of the optical imaging system according to example 5, representing deviations of different image heights on an imaging plane after light passes through the optical imaging system. It can be seen from FIG. 10A to FIG. 10C that the optical imaging system provided in example 5 may achieve good image quality.

EXAMPLE 6

Figure 11:
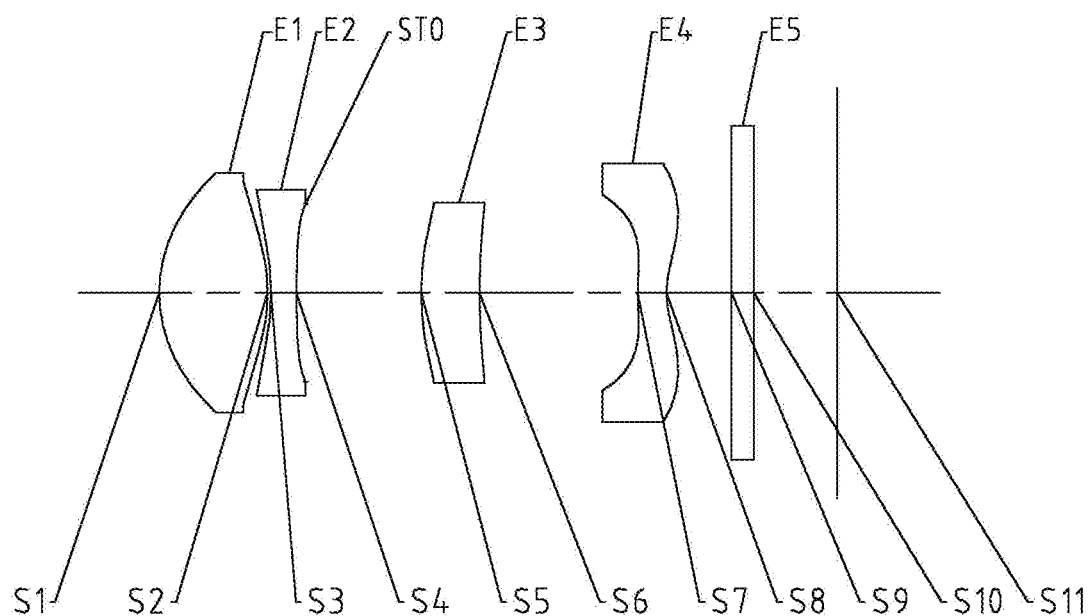
FIG. 11 illustrates a schematic structural view of an optical imaging system according to Example 6 of the present disclosure.

An optical imaging system according to example 6 of the present disclosure is described below with reference to FIG. 11 to FIG. 12C. FIG. 11 shows a schematic structural view of the optical imaging system according to example 6 of the present disclosure.

As shown in FIG. 11, the optical imaging system includes a first lens E1, a second lens E2, a stop STO, a third lens E3, a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

In example 6, a total effective focal length f of the optical imaging system is 1.41 mm, and an on-axis distance TTL from the object-side surface S1 of the first lens E1 to the imaging plane S11 is 6.40 mm.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 5.0000 | | | | |
| S1 | Aspheric | 1.3590 | 1.0217 | 1.546 | 56.11 | 1.76 | 0.0357 |
| S2 | Aspheric | −2.3868 | 0.0334 | | | | −4.7324 |
| S3 | Aspheric | −3.8627 | 0.2385 | 1.678 | 19.25 | −3.80 | 9.7529 |
| S4 | Aspheric | 7.8871 | 0.0883 | | | | 77.4816 |
| STO | Spherical | Infinite | 1.0925 | | | | |
| S5 | Aspheric | 2.9423 | 0.5482 | 1.678 | 19.25 | 7.39 | −99.0000 |
| S6 | Aspheric | 6.6094 | 1.4940 | | | | −70.1735 |
| S7 | Aspheric | 2.2700 | 0.2721 | 1.536 | 55.74 | −2.53 | −23.9908 |
| S8 | Aspheric | 0.8139 | 0.6152 | | | | −5.1663 |
| S9 | Spherical | Infinite | 0.2100 | 1.517 | 64.17 | | |
| S10 | Spherical | Infinite | 0.7860 | | | | |
| S11 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −3.1686E−02 | 9.8147E−02 | −7.0022E−01 | 2.5171E+00 | −5.2756E+00 | 6.5680E+00 | −4.7904E+00 | 1.8870E+00 | −3.1052E−01 |
| S2 | −9.8261E−01 | 4.9680E+00 | −1.1993E+01 | 1.4410E+01 | −3.7240E+00 | −1.1726E+01 | 1.5215E+01 | −7.6386E+00 | 1.4448E+00 |
| S3 | −1.0220E+00 | 4.8252E+00 | −8.0295E+00 | −5.6155E+00 | 4.7983E+01 | −8.8286E+01 | 8.0609E+01 | −3.7519E+01 | 7.0860E+00 |
| S4 | −1.9665E−01 | 7.6185E−01 | 1.9560E−01 | −3.8285E+00 | −4.4290E+00 | 5.1828E+01 | −1.1208E+02 | 1.0419E+02 | −3.6861E+01 |
| S5 | 4.5414E−01 | −1.7932E+00 | 6.5886E+00 | −1.8389E+01 | 3.5776E+01 | −4.6562E+01 | 3.8133E+01 | −1.7651E+01 | 3.5045E+00 |
| S6 | 2.5856E−02 | 1.9089E−01 | −1.1899E+00 | 4.0243E+00 | −9.0097E+00 | 1.2647E+01 | −1.0883E+01 | 5.2350E+00 | −1.0647E+00 |
| S7 | −1.0608E+00 | 1.5320E+00 | −4.4675E+00 | 1.5709E+01 | −3.9622E+01 | 6.1358E+01 | −5.5733E+01 | 2.7019E+01 | −5.3482E+00 |
| S8 | −6.3165E−01 | 8.0668E−01 | −6.2220E−01 | −4.9614E−02 | 6.8416E−01 | −7.6692E−01 | 4.3680E−01 | −1.3395E−01 | 1.7748E−02 |

Figures 12A, 12B:
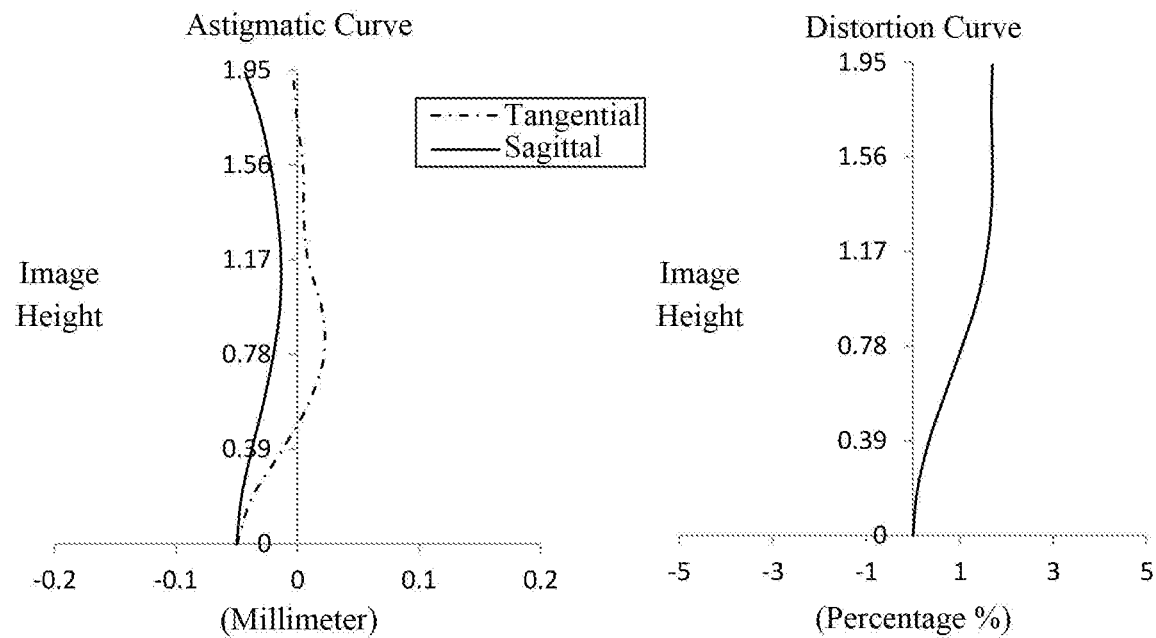
FIGS. 12A to 12C illustrate an astigmatic curve, a distortion curve, and a lateral color curve of the optical imaging system of the Example 6, respectively.
Figure 12C:
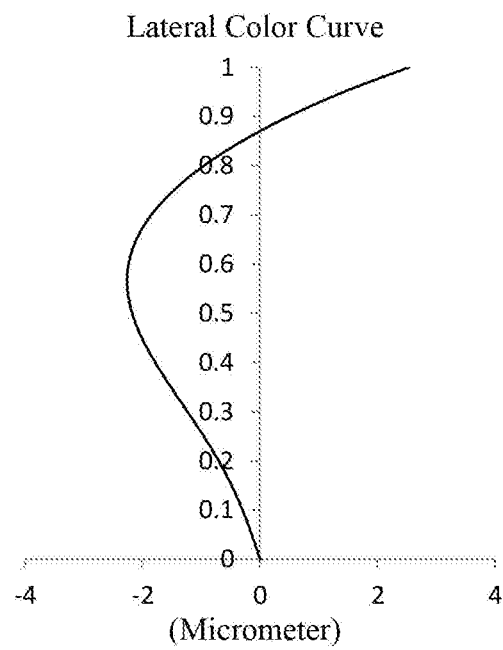

FIG. 12A illustrates an astigmatic curve of the optical imaging system according to example 6, representing a curvature of a tangential plane and a curvature of a sagittal plane. FIG. 12B illustrates a distortion curve of the optical imaging system according to example 6, representing amounts of distortion corresponding to different image heights. FIG. 12C illustrates a lateral color curve of the optical imaging system according to example 6, representing deviations of different image heights on an imaging plane after light passes through the optical imaging system. It can be seen from FIG. 12A to FIG. 12C that the optical imaging system provided in example 6 may achieve good image quality.

EXAMPLE 7

Figure 13:
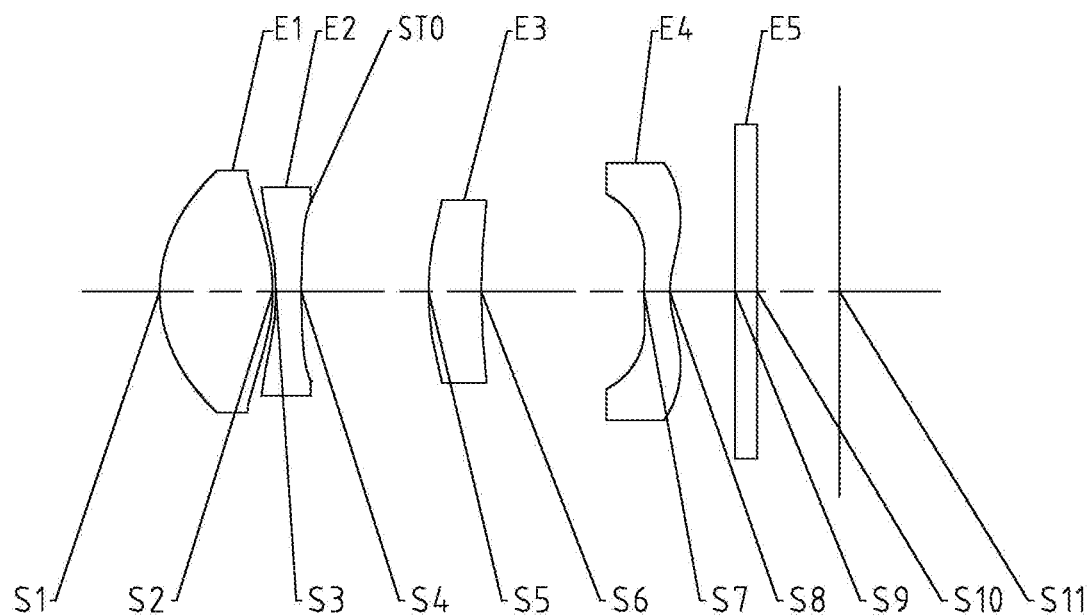
FIG. 13 illustrates a schematic structural view of an optical imaging system according to Example 7 of the present disclosure.

An optical imaging system according to example 7 of the present disclosure is described below with reference to FIG. 13 to FIG. 14C. FIG. 13 shows a schematic structural view of the optical imaging system according to example 7 of the present disclosure.

As shown in FIG. 13, the optical imaging system includes a first lens E1, a second lens E2, a stop STO, a third lens E3, a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

In example 7, a total effective focal length f of the optical imaging system is 1.40 mm, and an on-axis distance TTL from the object-side surface S1 of the first lens E1 to the imaging plane S11 is 6.42 mm.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 4.6000 | | | | |
| S1 | Aspheric | 1.3622 | 1.0675 | 1.546 | 56.11 | 1.76 | 0.0369 |
| S2 | Aspheric | −2.3814 | 0.0319 | | | | −4.5870 |
| S3 | Aspheric | −3.8749 | 0.2385 | 1.678 | 19.25 | −3.81 | 9.4550 |
| S4 | Aspheric | 7.9299 | 0.0905 | | | | 77.1944 |
| STO | Spherical | Infinite | 1.1113 | | | | |
| S5 | Aspheric | 2.8932 | 0.4965 | 1.678 | 19.25 | 7.33 | −99.0000 |
| S6 | Aspheric | 6.4623 | 1.5364 | | | | −64.0963 |
| S7 | Aspheric | 2.1818 | 0.2432 | 1.536 | 55.74 | −2.49 | −29.7119 |
| S8 | Aspheric | 0.7971 | 0.6152 | | | | −5.6054 |
| S9 | Spherical | Infinite | 0.2100 | 1.517 | 64.17 | | |
| S10 | Spherical | Infinite | 0.7791 | | | | |
| S11 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | −3.2266E−02 | 1.0140E−01 | −7.0814E−01 | 2.4592E+00 | −5.0008E+00 | 6.0826E+00 | −4.3645E+00 | 1.7025E+00 | −2.7915E−01 |
| S2 | −9.7564E−01 | 4.8836E+00 | −1.2086E+01 | 1.6434E+01 | −1.0183E+01 | −1.8069E+00 | 6.9208E+00 | −3.9988E+00 | 7.8608E−01 |
| S3 | −1.0145E+00 | 4.7790E+00 | −8.9122E+00 | 1.0041E+00 | 2.8324E+01 | −5.7201E+01 | 5.3050E+01 | −2.4593E+01 | 4.5903E+00 |
| S4 | −1.9694E−01 | 8.6259E−01 | −1.1038E+00 | 2.5007E+00 | −1.9293E+01 | 6.7935E+01 | −1.1487E+02 | 9.5466E+01 | −3.1592E+01 |
| S5 | 4.4752E−01 | −1.8648E+00 | 6.7260E+00 | −1.8324E+01 | 3.4712E+01 | −4.4053E+01 | 3.5315E+01 | −1.6105E+01 | 3.1767E+00 |
| S6 | 2.9307E−02 | 2.4302E−01 | −1.5820E+00 | 5.5895E+00 | −1.2922E+01 | 1.8742E+01 | −1.6616E+01 | 8.1869E+00 | −1.6976E+00 |
| S7 | −1.1462E+00 | 1.8195E+00 | −5.4602E+00 | 1.8911E+01 | −4.6867E+01 | 7.1674E+01 | −6.4499E+01 | 3.1050E+01 | −6.1150E+00 |
| S8 | −6.6751E−01 | 8.7537E−01 | −6.7744E−01 | −4.4271E−02 | 6.9181E−01 | −7.4446E−01 | 4.0280E−01 | −1.1735E−01 | 1.4949E−02 |

Figures 14A, 14B:
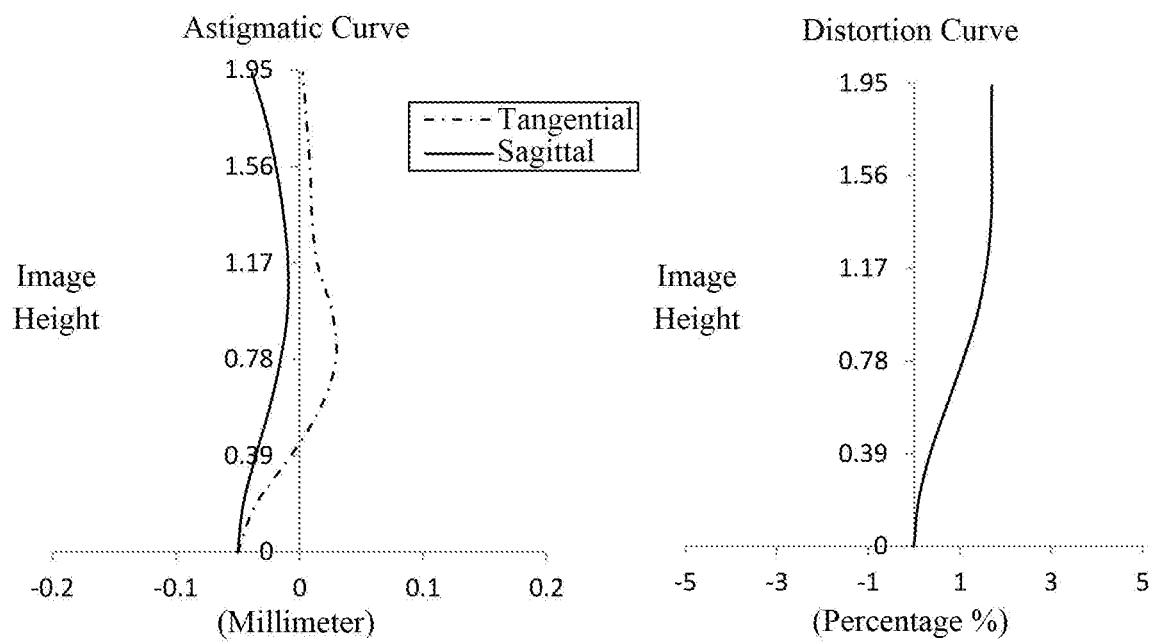
FIGS. 14A to 14C illustrate an astigmatic curve, a distortion curve, and a lateral color curve of the optical imaging system of the Example 7, respectively.
Figure 14C:
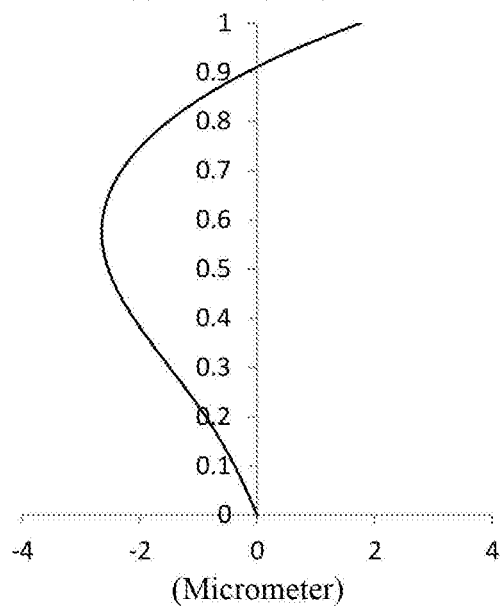

FIG. 14A illustrates an astigmatic curve of the optical imaging system according to example 7, representing a curvature of a tangential plane and a curvature of a sagittal plane. FIG. 14B illustrates a distortion curve of the optical imaging system according to example 7, representing amounts of distortion corresponding to different image heights. FIG. 14C illustrates a lateral color curve of the optical imaging system according to example 7, representing deviations of different image heights on an imaging plane after light passes through the optical imaging system. It can be seen from FIG. 14A to FIG. 14C that the optical imaging system provided in example 7 may achieve good image quality.

EXAMPLE 8

Figure 16C:
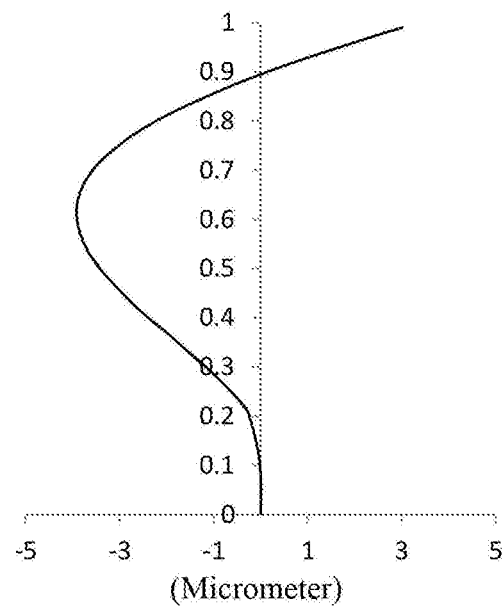
FIGS. 16A to 16C illustrate an astigmatic curve, a distortion curve, and a lateral color curve of the optical imaging system of the Example 8, respectively.
Figure 15:
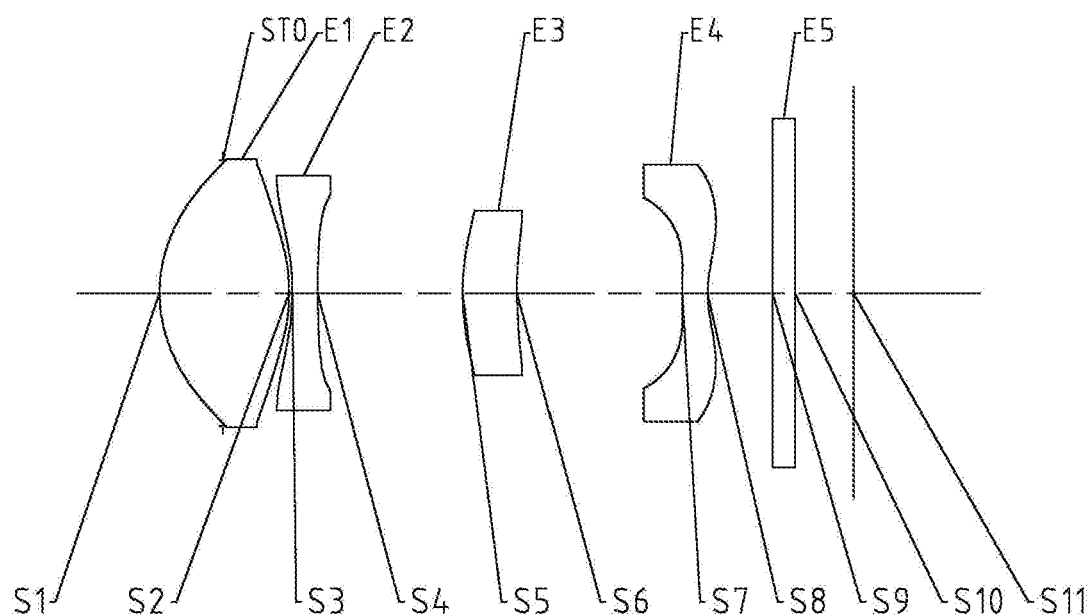
FIG. 15 illustrates a schematic structural view of an optical imaging system according to Example 8 of the present disclosure.

An optical imaging system according to example 8 of the present disclosure is described below with reference to FIG. 15 to FIG. 16C. FIG. 15 shows a schematic structural view of the optical imaging system according to example 8 of the present disclosure.

As shown in FIG. 15, the optical imaging system includes a stop STO, a first lens E1, a second lens E2, a third lens E3, a fourth lens E4 and an optical filter E5, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The optical filter E5 has an object-side surface S9 and an image-side surface S10. The optical imaging system has an imaging plane S11, and light from an object sequentially passes through the respective surfaces S1 to S10 and is finally imaged on the imaging plane S11.

In example 8, a total effective focal length f of the optical imaging system is 1.35 mm, and an on-axis distance TTL from the object-side surface S1 of the first lens E1 to the imaging plane S11 is 6.55 mm.

Table 15 is a table illustrating basic parameters of the optical imaging system of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 4.6000 | | | | |
| STO | Spherical | Infinite | −0.6000 | | | | |
| S1 | Aspheric | 1.3781 | 1.2248 | 1.546 | 56.11 | 1.80 | 0.0299 |
| S2 | Aspheric | −2.3509 | 0.0300 | | | | −3.7266 |
| S3 | Aspheric | −3.8384 | 0.2385 | 1.678 | 19.25 | −3.87 | 8.1554 |
| S4 | Aspheric | 8.4273 | 1.3701 | | | | 75.0554 |
| S5 | Aspheric | 2.4667 | 0.5121 | 1.678 | 19.25 | 7.73 | −99.0000 |
| S6 | Aspheric | 4.2767 | 1.5566 | | | | −68.6566 |
| S7 | Aspheric | 4.5264 | 0.2385 | 1.536 | 55.74 | −2.44 | −13.1925 |
| S8 | Aspheric | 0.9962 | 0.6152 | | | | −8.4665 |
| S9 | Spherical | Infinite | 0.2100 | 1.517 | 64.17 | | |
| S10 | Spherical | Infinite | 0.5542 | | | | |
| S11 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | −3.1987E−02 | 2.6958E−02 | −2.3159E−01 | 7.1996E−01 | −1.2756E+00 | 1.3213E+00 | −8.0564E−01 | 2.6865E−01 | −3.8283E−02 |
| S2 | −8.7928E−01 | 4.1176E+00 | −9.8544E+00 | 1.4302E+01 | −1.3063E+01 | 7.4552E+00 | −2.5263E+00 | 4.4509E−01 | −2.8012E−02 |
| S3 | −8.8844E−01 | 3.9586E+00 | −7.6609E+00 | 5.7552E+00 | 4.5909E+00 | −1.3740E+01 | 1.2346E+01 | −5.2236E+00 | 8.8137E−01 |
| S4 | −1.6102E−01 | 8.8667E−01 | −2.8672E+00 | 1.0889E+01 | −3.4045E+01 | 6.7583E+01 | −7.8363E+01 | 4.8673E+01 | −1.2561E+01 |
| S5 | 7.4005E−01 | −3.9897E+00 | 1.8062E+01 | −5.9806E+01 | 1.3473E+02 | −1.9941E+02 | 1.8371E+02 | −9.4956E+01 | 2.0952E+01 |
| S6 | 9.7538E−02 | 1.3625E−01 | −2.6346E+00 | 1.2827E+01 | −3.7439E+01 | 6.6621E+01 | −7.0754E+01 | 4.0936E+01 | −9.8432E+00 |
| S7 | −1.2956E+00 | 3.0166E+00 | −1.0939E+01 | 3.5765E+01 | −8.1594E+01 | 1.1811E+02 | −1.0269E+02 | 4.8197E+01 | −9.2785E+00 |
| S8 | −5.3293E−01 | 6.4618E−01 | −4.3845E−01 | −1.9896E−01 | 7.9587E−01 | −8.7501E−01 | 5.2176E−01 | −1.7098E−01 | 2.4315E−02 |

Figures 16A, 16B:
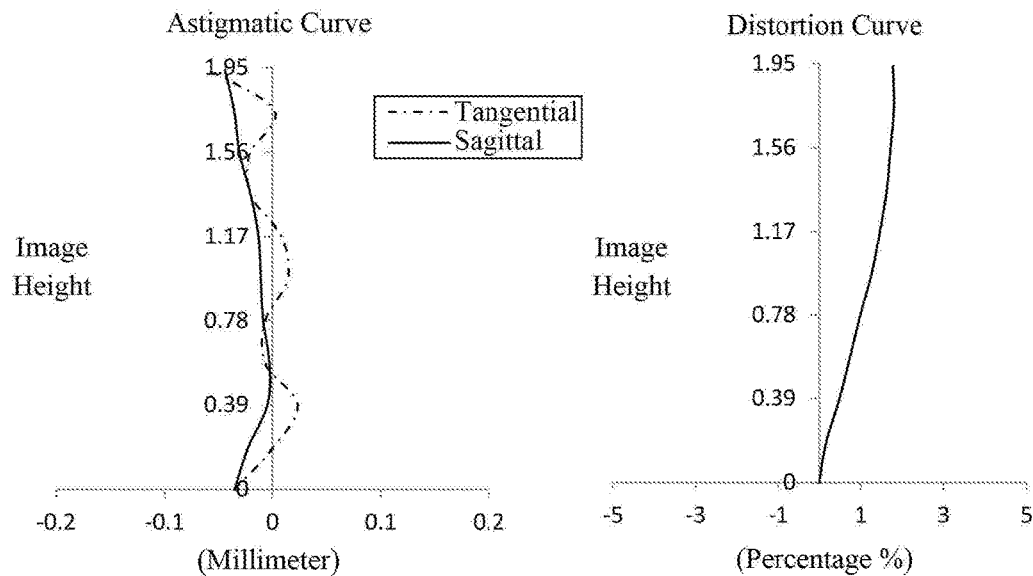

FIG. 16A illustrates an astigmatic curve of the optical imaging system according to example 8, representing a curvature of a tangential plane and a curvature of a sagittal plane. FIG. 16B illustrates a distortion curve of the optical imaging system according to example 8, representing amounts of distortion corresponding to different image heights. FIG. 16C illustrates a lateral color curve of the optical imaging system according to example 8, representing deviations of different image heights on an imaging plane after light passes through the optical imaging system. It can be seen from FIG. 16A to FIG. 16C that the optical imaging system provided in example 8 may achieve good image quality.

In view of the above, examples 1 to 8 respectively satisfy the relationship shown in Table 17.

The present disclosure further provides an imaging apparatus provided with an electronic photosensitive element for imaging. The photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The present disclosure further provides a fingerprint recognition apparatus, which includes the aforementioned optical imaging system, and may also include a plate lens disposed on the object side of the first lens. The plate lens has no refractive power. There may be an air interval (that

TABLE 17

| Condition/Example | 1 | 2 | 3 | 4 | 5 | 6 | 7 | 8 |
|---|---|---|---|---|---|---|---|---|
| Fno | 3.57 | 3.90 | 3.60 | 4.00 | 4.10 | 3.60 | 3.57 | 3.19 |
| TTL/f | 4.57 | 4.56 | 4.54 | 4.68 | 4.54 | 4.54 | 4.57 | 4.84 |
| f/EPD | 0.52 | 0.58 | 0.53 | 0.59 | 0.63 | 0.53 | 0.51 | 0.54 |
| N * sinθ | 0.24 | 0.22 | 0.24 | 0.22 | 0.21 | 0.24 | 0.24 | 0.27 |
| DT11/DT42 | 0.94 | 0.94 | 0.92 | 0.78 | 0.85 | 0.92 | 0.94 | 1.04 |
| (T23 + T34)/ΣCT | 1.36 | 1.22 | 1.26 | 1.26 | 1.17 | 1.29 | 1.34 | 1.32 |
| f/CT1 | 1.36 | 1.37 | 1.37 | 1.59 | 1.48 | 1.38 | 1.32 | 1.11 |
| T12 (mm) | 0.04 | 0.03 | 0.03 | 0.05 | 0.03 | 0.03 | 0.03 | 0.03 |
| (R1 + R2)/(R1 − R2) | −0.27 | −0.28 | −0.27 | −0.29 | −0.29 | −0.27 | −0.27 | −0.26 |
| (R3 − R4)/(R3 + R4) | −2.91 | −2.94 | −2.92 | −2.59 | −2.67 | −2.92 | −2.91 | −2.67 |
| f/R5 | 0.48 | 0.48 | 0.48 | 0.43 | 0.47 | 0.48 | 0.49 | 0.55 |
| f/f1 − f/f3 | 0.61 | 0.61 | 0.61 | 0.60 | 0.62 | 0.61 | 0.60 | 0.58 |
| f/|f2| − f/|f4| | −0.19 | −0.18 | −0.18 | −0.22 | −0.17 | −0.19 | −0.19 | −0.20 |
| TTL/To | 1.61 | 1.60 | 1.68 | 2.13 | 1.88 | 1.28 | 1.40 | 1.64 |
| ImgH/Do | 1.76 | 1.75 | 1.82 | 2.22 | 1.97 | 1.48 | 1.59 | 1.74 | is, object space) between the plate lens and the first lens. The distance between the object-side surface of the plate lens and the object-side surface of the first lens may be equal to the distance (To) along the optical axis from the to-be-captured object to the object-side surface of the first lens.

This disclosure further provides a microscopic imaging apparatus, which is provided with the aforementioned optical imaging system. The microscopic imaging apparatus may also be provided with a stage for holding the to-be-captured object. The stage faces the object-side surface of the first lens, and the relative distance therebetween is adjustable. The space between the stage and the object-side surface of the first lens is the object space of the optical imaging system, and the medium in the object space may be air, water or grease. The microscopic imaging apparatus has good imaging quality.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:
    a first lens having positive refractive power;
    a second lens having negative refractive power;
    a third lens having positive refractive power; and
    a fourth lens having negative refractive power,
    wherein 1<TTL/To<2.5,
    where TTL is a distance along the optical axis from an object-side surface of the first lens to an imaging plane of the optical imaging system, and To is a distance along the optical axis from a to-be-captured object to the object-side surface of the first lens.

2. The optical imaging system according to claim 1, wherein 4<TTL/f<5,
    where TTL is the distance along the optical axis from the object-side surface of the first lens to the imaging plane of the optical imaging system, and f is a total effective focal length of the optical imaging system.

3. The optical imaging system according to claim 1, wherein ImgH/Do>1.0,
    where ImgH is half of a diagonal length of an effective pixel area on the imaging plane of the optical imaging system, and Do is a height of the to-be-captured object.

4. The optical imaging system according to claim 1, wherein N*sin θ<0.7,
    where N is a refractive index of an object space of the optical imaging system, and θ is an aperture angle of the object space of the optical imaging system.

5. The optical imaging system according to claim 1, wherein 0.7<DT11/DT42<1.1,
    where DT11 is half of a maximum effective aperture of the object-side surface of the first lens, and DT42 is half of a maximum effective aperture of an image-side surface of the fourth lens.

6. The optical imaging system according to claim 1, wherein T12≤0.1 mm,
    where T12 is a spaced interval between the first lens and the second lens along the optical axis.

7. The optical imaging system according to claim 1, wherein −0.5<(R1+R2)/(R1−R2)<0,
    where R1 is a radius of curvature of the object-side surface of the first lens, and R2 is a radius of curvature of an image-side surface of the first lens.

8. The optical imaging system according to claim 1, wherein −3<(R3−R4)/(R3+R4)<−2,
    where R3 is a radius of curvature of an object-side surface of the second lens, and R4 is a radius of curvature of an image-side surface of the second lens.

9. The optical imaging system according to claim 1, wherein f/R5≤0.6,
    where f is a total effective focal length of the optical imaging system, and R5 is a radius of curvature of an object-side surface of the third lens.

10. The optical imaging system according to claim 1, wherein 0.5<f/f1−f/f3<1.0,
    where f is a total effective focal length of the optical imaging system, f1 is an effective focal length of the first lens, and f3 is an effective focal length of the third lens.

11. The optical imaging system according to claim 1, wherein −0.5<f/|f2|−f/|f4|<0,
    where f is a total effective focal length of the optical imaging system, f2 is an effective focal length of the second lens, and f4 is an effective focal length of the fourth lens.

12. The optical imaging system according to claim 1, wherein Fno>3.0,
    where Fno is an F number of the optical imaging system in a case of an object distance being finite.

13. An optical imaging system, sequentially from an object side to an image side of the optical imaging system along an optical axis, comprising:
    a first lens having positive refractive power;
    a second lens having negative refractive power;
    a third lens having positive refractive power; and
    a fourth lens having negative refractive power,
    wherein f/EPD<1.0,
    where f is a total effective focal length of the optical imaging system, and EPD is an entrance pupil diameter of the optical imaging system.

14. The optical imaging system according to claim 13, wherein 4<TTL/f<5,
    where TTL is a distance along the optical axis from an object-side surface of the first lens to an imaging plane of the optical imaging system, and f is the total effective focal length of the optical imaging system.

15. The optical imaging system according to claim 13, wherein ImgH/Do>1.0,
    where ImgH is half of a diagonal length of an effective pixel area on an imaging plane of the optical imaging system, and Do is a height of a to-be-captured object.

16. The optical imaging system according to claim 13, wherein 1<(T23+T34)/ΣCT<1.5,
    where ΣCT is a sum of the center thicknesses of the first to the fourth lenses along the optical axis, T23 is a spaced interval between the second lens and the third lens along the optical axis, and T34 is a spaced interval between the third lens and the fourth lens along the optical axis.

17. The optical imaging system according to claim 13, wherein 1<f/CT1≤1.6, where f is the total effective focal length of the optical imaging system, and CT1 is a center thickness of the first lens along the optical axis.

18. The optical imaging system according to claim 13, wherein $f/R5 \leq 0.6$,
where f is the total effective focal length of the optical imaging system, and R5 is a radius of curvature of an object-side surface of the third lens.

19. The optical imaging system according to claim 13, wherein $0.5 < f/f1 - f/f3 < 1.0$,
where f is the total effective focal length of the optical imaging system, f1 is an effective focal length of the first lens, and f3 is an effective focal length of the third lens.

20. The optical imaging system according to claim 13, wherein $-0.5 < f/|f2| - f/|f4| < 0$,
where f is the total effective focal length of the optical imaging system, f2 is an effective focal length of the second lens, and f4 is an effective focal length of the fourth lens.

* * * * *